United States Patent

Gilhousen et al.

[11] Patent Number: 5,812,938
[45] Date of Patent: *Sep. 22, 1998

[54] REVERSE LINK, CLOSED LOOP POWER CONTROL IN A CODE DIVISION MULTIPLE ACCESS SYSTEM

[75] Inventors: Klein S. Gilhousen, Bozeman, Mont.; Charles E. Wheatley, III, Del Mar; Jeffrey A. Levin, San Diego, both of Calif.

[73] Assignee: QUALCOMM Incorporated, San Diego, Calif.

[*] Notice: The term of this patent shall not extend beyond the expiration date of Pat. No. 5,603,096.

[21] Appl. No.: 719,296

[22] Filed: Sep. 19, 1996

Related U.S. Application Data

[63] Continuation of Ser. No. 272,484, Jul. 11, 1994, Pat. No. 5,603,096.

[51] Int. Cl.⁶ .................................................... H04B 7/00
[52] U.S. Cl. ............................ 455/69; 455/522; 455/561; 455/517
[58] Field of Search ................................ 455/69, 70, 127, 455/114–115, 33.1, 422, 522, 561, 517, 524, 343, 226.1, 226.2, 226.3, 100, 574, 67.1, 117; 370/318, 310, 320; 375/200, 205

[56] References Cited

U.S. PATENT DOCUMENTS

| | | | |
|---|---|---|---|
| 5,396,516 | 3/1995 | Padovani et al. | 455/69 |
| 5,461,639 | 10/1995 | Wheatley, III et al. | 455/422 |
| 5,603,096 | 2/1997 | Gilhousen et al. | 455/69 |

*Primary Examiner*—Reinhard J. Eisenzopf
*Assistant Examiner*—Doris To
*Attorney, Agent, or Firm*—Russell B. Miller; Roger W. Martin

[57] ABSTRACT

The process of the present invention enables a mobile radiotelephone to operate at a 100% duty cycle while providing closed loop power control. The base station measures the signal to noise ratio of the signal from the mobile and compares that SNR with the SNR threshold values the base station has for each data rate the mobile is capable of transmitting. The base station then generates power control commands to instruct the mobile to change its power depending on the outcome of the comparisons.

10 Claims, 3 Drawing Sheets

REVERSE LINK, CLOSED LOOP POWER CONTROL IN A CODE DIVISION MULTIPLE ACCESS SYSTEM

This is a continuation of application Ser. No. 08/272,484, filed Jul. 11, 1994 now U.S. Pat. No. 5,603,096.

BACKGROUND OF THE INVENTION

I. Field of the Invention

The present invention relates generally to radiotelephone communications. More particularly, the present invention relates to reverse link power control in a radiotelephone system.

II. Description of the Related Art

The Federal Communications Commission (FCC) governs the use of the radio frequency (RF) spectrum, deciding which industry gets certain frequencies. Since the RF spectrum is limited, only a small portion of the spectrum can be assigned to each industry. The assigned spectrum, therefore, must be used efficiently in order to allow as many frequency users as possible to have access to the spectrum.

Multiple access modulation techniques are some of the most efficient techniques for utilizing the RF spectrum. Examples of such modulation techniques include time division multiple access (TDMA), frequency division multiple access (FDMA), and code division multiple access (CDMA).

CDMA modulation employs a spread spectrum technique for the transmission of information. A spread spectrum system uses a modulation technique that spreads the transmitted signal over a wide frequency band. This frequency band is typically substantially wider than the minimum bandwidth required to transmit the signal. The spread spectrum technique is accomplished by modulating each baseband data signal to be transmitted with a unique wide band spreading code. Using this technique, a signal having a bandwidth of only a few kilohertz can be spread over a bandwidth of more than a megahertz. Typical examples of spread spectrum techniques can be found in *Spread Spectrum Communications*, Volume i, M. K. Simon, Chap. 5, pp. 262–358.

A form of frequency diversity is obtained by spreading the transmitted signal over a wide frequency range. Since only 200–300 kHz of a signal is typically affected by a frequency selective fade, the remaining spectrum of the transmitted signal is unaffected. A receiver that receives the spread spectrum signal, therefore, will be affected less by the fade condition.

In a CDMA-type radiotelephone system, multiple signals are transmitted simultaneously at the same frequency. Such a CDMA system is disclosed in U.S. Pat. No. 4,901,307 to Gilhousen et al. and assigned to Qualcomm, Inc. In this type system, a particular receiver determines which signal is intended for that receiver by the unique spreading code in the signal. The signals at that frequency without the particular spreading code intended for that particular receiver appear to be noise to that receiver and are ignored.

Figure 1:
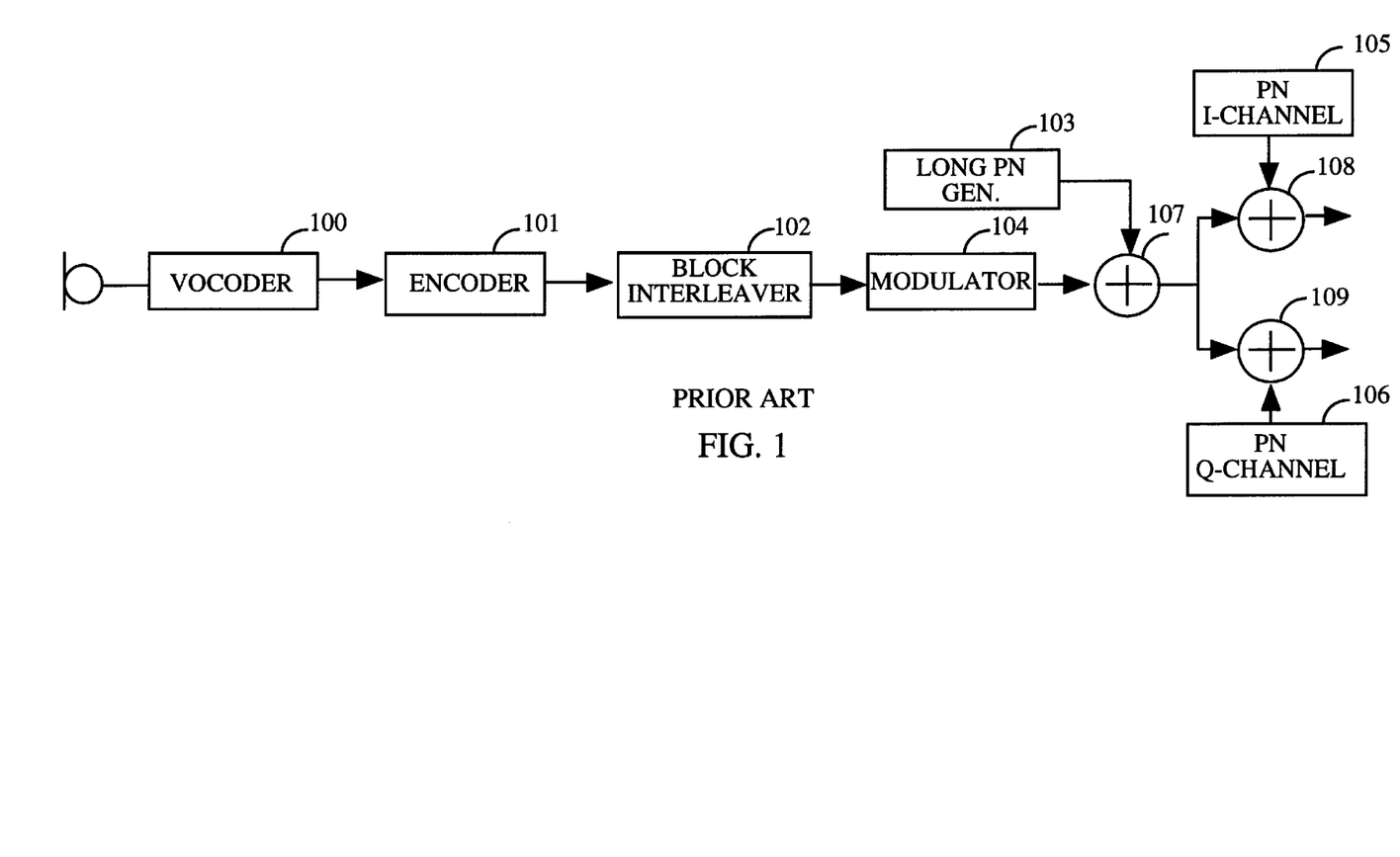
FIG. 1 shows a block diagram of a typical prior art CDMA reverse link transmitter for use in a radiotelephone system.

FIG. 1 shows a typical prior art CDMA transmitter for use on the reverse channel of a radiotelephone system, the reverse channel being the link from the mobile to the base station. A digital baseband signal is first generated by a vocoder (voice encoder/decoder). The vocoder (100) digitizes an analog voice or data signal using an encoding process such as the Code Excited Linear Prediction (CELP) process that is well known in the art.

The digital baseband signal is input to a convolutional encoder (101) at a particular rate, such as 9600 bps. The encoder (101) convolutionally encodes the input data bits into data symbols at a fixed encoding rate. For example, the encoder (101) could encode the data bits at a fixed encoding rate of one data bit to three data symbols such that the encoder (101) outputs data symbols at a 28.8 ksym/s rate with a 9600 bps input rate.

The data symbols from the encoder are input to an interleaver (102). The interleaver (102) scrambles the symbols such that any symbols lost over the channel won't be contiguous symbols. Therefore, if more than one symbol is lost in the communications channel, the error correcting code is able to recover the information. The data symbols are input into the interleaver (102) in a column by column matrix and output from the matrix row by row. The interleaving takes place at the same 28.8 ksym/s data symbol rate that the data symbols were input.

The interleaved data symbols are input to a modulator (104). The modulator (104) derives a sequence of fixed length Walsh symbols from the interleaved data symbols. In 64-ary orthogonal code signaling, the interleaved data symbols are grouped into sets of six to select one out of the 64 orthogonal codes to represent the set of six data symbols. These 64 orthogonal codes correspond to Walsh symbols from a 64 by 64 Hadamard matrix wherein a Walsh symbol is a single row or column of the matrix. The modulator outputs a sequence of Walsh symbols, corresponding to the input data symbols at a fixed symbol rate, to one input of an XOR combiner (107). The set of six grouped Walsh symbols has a length of 1.25 milliseconds (ms) and is typically referred to as a power control group.

A pseudo random noise (PN) generator (103) uses a long PN sequence to generate a user specific sequence of symbols. In a mobile radiotelephone having an electronic serial number (ESN), the ESN can be exclusive-ORed with the long PN sequence to generate the sequence, making the sequence specific to that radiotelephone user. The long PN generator (103) inputs and outputs data at the spreading rate of the system. The output of the PN generator (103) is coupled to the XOR combiner (107).

The Walsh code spread symbols from the combiner (107) are next spread in quadrature. The symbols are input to two XOR combiners (108 and 109) that generate a pair of short PN sequences. The first combiner (108) XORs the Walsh code spread symbols with the in-phase (I) sequence (105) while the second combiner (109) XORs the Walsh code spread symbols with the quadrature phase (Q) sequence (106).

The resulting I and Q channel code spread sequences are used to bi-phase modulate a quadrature pair of sinusoids by driving the power level of the pair of sinusoids. The sinusoidal output signals are then summed, bandpass filtered, translated to an RF frequency, amplified, filtered, and radiated by an antenna.

Figure 2:
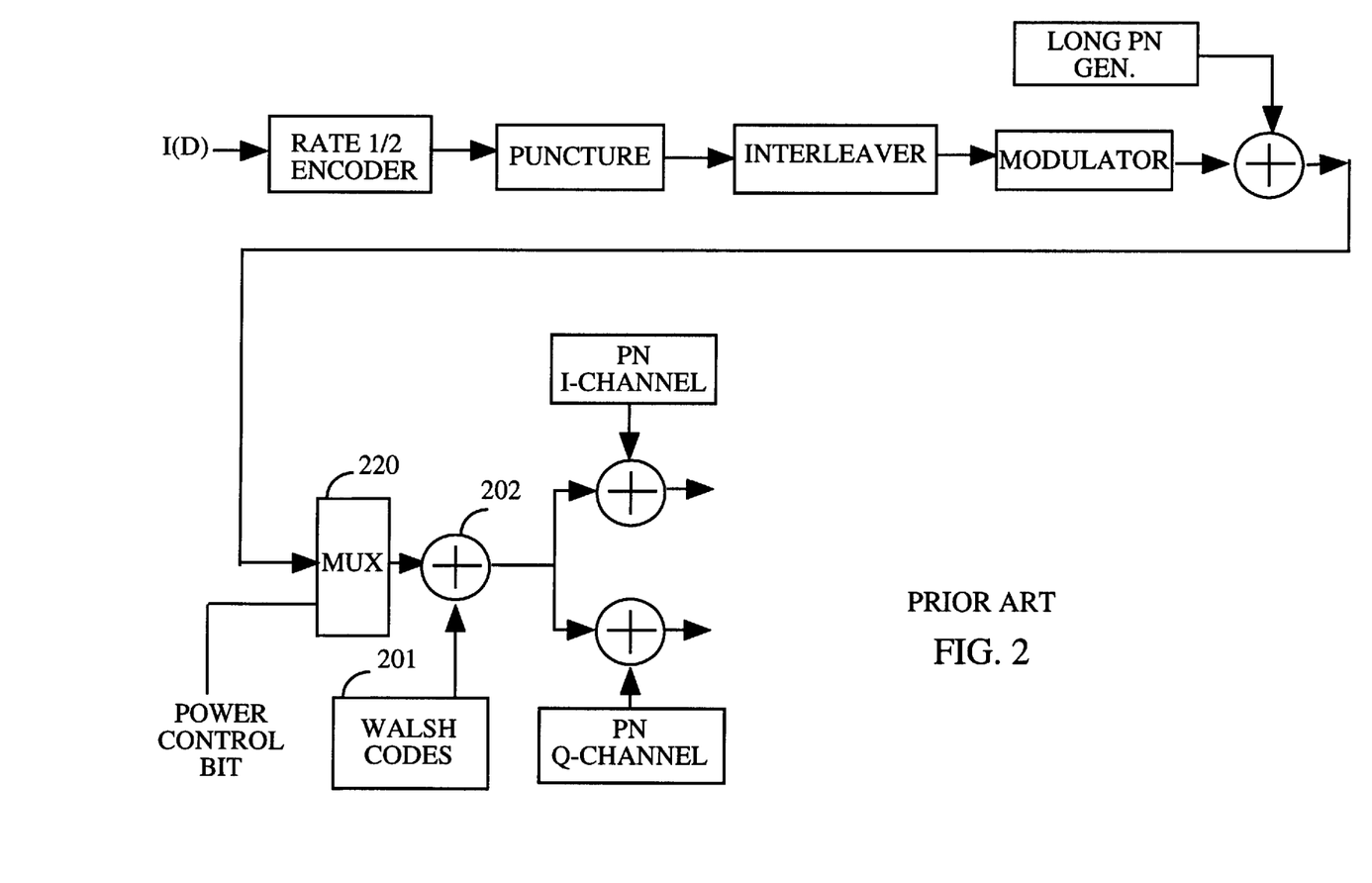
FIG. 2 shows a block diagram of a typical prior art CDMA forward link transmitter for use in a radiotelephone system.

The typical prior art CDMA transmitter used on the forward channel of a radiotelephone system, the link from the base station to the mobile, is similar to the reverse channel. This transmitter is illustrated in FIG. 2. The difference between the forward and reverse channel transmitters is the addition of a Walsh code generator (201) and power control bit multiplexer (220) between the PN generator combiner (103) and the quadrature spreading combiners (108 and 109) for the forward channel transmitter.

The power control bit multiplexer (220) multiplexes a power control bit in place of another bit in the frame. The mobile knows the location of this bit and looks for this power control bit at that location. As an example, a "0", bit instructs the mobile to increase its mean output power level a predetermined amount and a "1" bit instructs the mobile to decrease its mean output level a predetermined amount.

The code division channel selection generator (201) is coupled to a combiner (202) and provides a particular Walsh symbol to the combiner (202). The generator (201) provides one of 64 orthogonal codes corresponding to 64 Walsh symbols from a 64 by 64 Hadamard matrix wherein a Walsh symbol is a single row or column of the matrix. The combiner (202) uses the particular Walsh code input by the code division channel generator (201) to spread the input scrambled data symbols into Walsh code spread data symbols. The Walsh code spread data symbols are output from the XOR combiner (202) and into the quadrature spreading combiners at a fixed chip rate of 1.2288 Mchp/s.

In the previously described system, as the mobile's transmission bit rate is reduced, it is desirable to reduce the average transmitter power accordingly. The mobile, therefore, reduces its transmit power, by reducing its transmitter duty cycle, as the data rate decreases. This permits the base station to measure the mobile's received signal to noise ratio (SNR) in each 1.25 ms. interval of six Walsh symbols, also known in the art as a power control group, and comparing this with a constant standard without the need to know the actual transmission rate being utilized in each data frame.

Each 20 ms. long data frame is comprised of 16 power control groups. Co-pending patent application U.S. Ser. No. 07/822,164 to Padovani et al. and assigned to Qualcomm, Inc. recites a more detailed explanation of the 20 ms frames that are transmitted on the forward and reverse channels. The amount of data transmitted in each frame depends on the data rate. The frame composition for each data rate for the forward and reverse channels is illustrated in the following table:

| Raw # bits | CRC | Tail | Rsrvd | Info bit | Rate |
|---|---|---|---|---|---|
| 288 | 12 | 8 | 3 | 265 | 13250 |
| 144 | 10 | 8 | 2 | 124 | 6200 |
| 72 | 8 | 8 | 2 | 54 | 2700 |
| 36 | 6 | 8 | 2 | 20 | 1000 |

The rate listed in the table is the information bit rate. The reserved bits for the forward and reverse channels, in the preferred embodiment, are for signaling, power control, and future use.

During each power control group that the mobile is transmitting, it transmits at a power level determined by the power control system of the base station. The base station measures the received SNR of each received mobile signal during the 1.25 ms. power control interval and compares it to a target SNR established for that particular mobile. If the SNR exceeds the target SNR, a "turn down" command is transmitted from the base station to the mobile. Otherwise a "turn up" command is sent.

These power control commands are transmitted to the mobile by puncturing the data transmission with the power control bit. This puncturing replaces a data bit with the power control bit. The receiving mobile typically responds to a turn down command by reducing its transmitter power by 1 dB and increases its power by 1 dB in response to a turn up command.

The disadvantage of the above described power control scheme is that the mobile transmitter signal is pulsed on and off when transmitting at less than the maximum data rate. While the system performs adequately with this scheme, it may cause interference to other electronic systems, such as hearing aids. The European radiotelephone system, Global System for Mobile communications, uses this power control scheme and exhibits such behavior. There is a resulting need for a power control scheme that enables the mobile to operate using a 100% duty cycle while providing fast and accurate closed loop power control from the base station to the mobile.

SUMMARY OF THE INVENTION

The process of the present invention enables a radiotelephone's transmitter to operate at a 100% duty cycle. The transmitted power is varied according to the bit transmission rate used in each 20 ms data transmission frame so as to transmit a constant energy for each information bit. The base station, not knowing the transmission rate in advance, maintains a table of SNR threshold values for each possible data rate that the radiotelephone might use. The base station then compares the SNR of the received signal to the threshold values and generates a different power control command for each SNR versus SNR threshold comparison. The base station transmits these commands to the radiotelephone. The radiotelephone, knowing the rate at which the data was transmitted, chooses the power control command corresponding to that data rate.

DETAILED DESCRIPTION OF THE PREFERRED EMBODIMENT

The process of the present invention provides power control of a mobile radiotelephone transmitter over the forward channel while allowing the mobile to transmit using a 100% duty cycle. This is accomplished by the mobile varying the transmit power for each frame according to the bit transmission rate and the base station monitoring the SNR of the transmitted signals and instructing the mobile to change its power accordingly.

Figure 3:
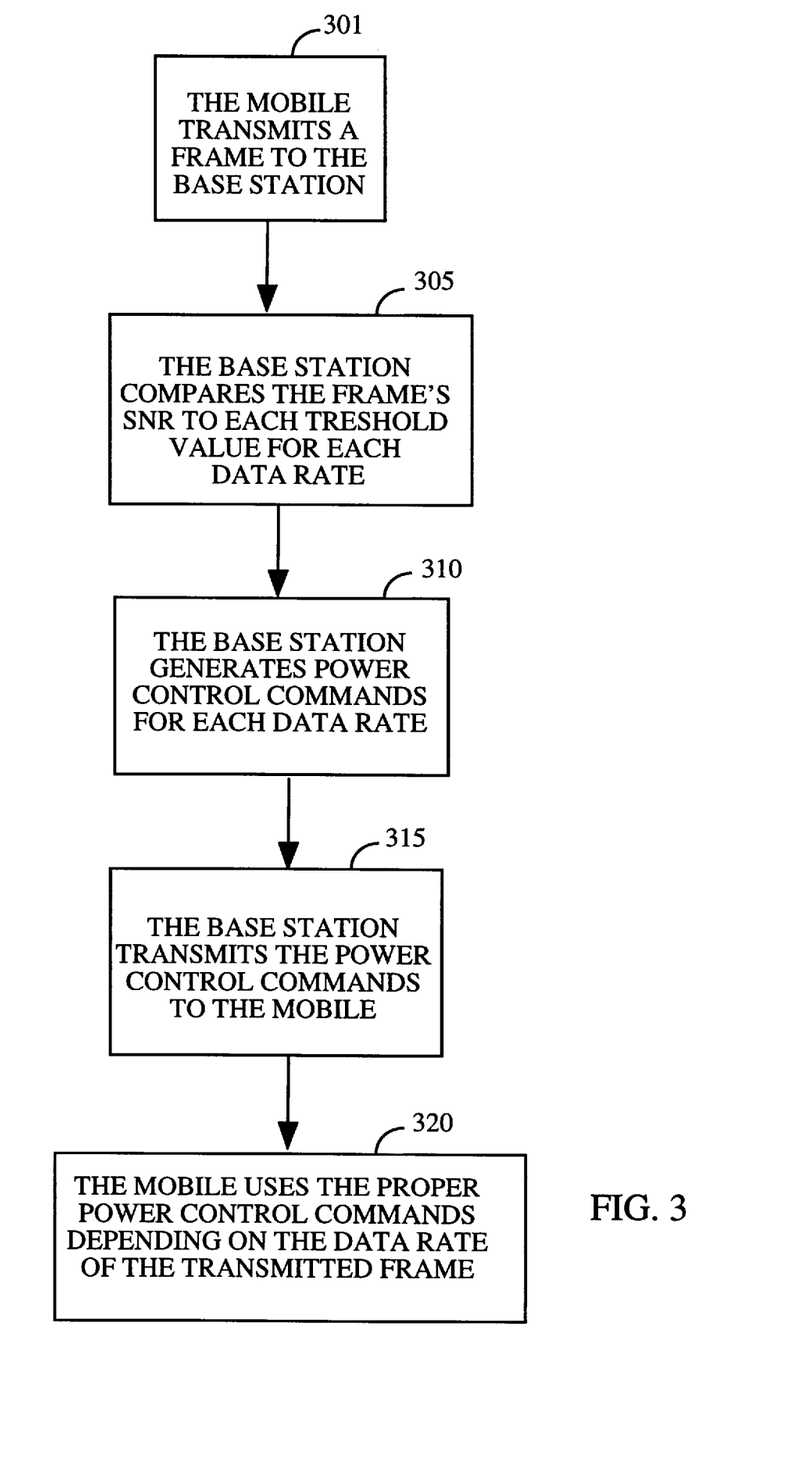
FIG. 3 shows a flowchart of the power control process of the present invention.

The closed loop power control process of the present invention, illustrated in the flowchart of FIG. 3, begins by the mobile transmitting a signal (301) formatted into the frames of data described above. The transmitter is operating at a 100% duty cycle but varies the transmit power of each frame according to the frame's transmission rate.

In the preferred embodiment, the mobile has a variable rate vocoder that operates at 9600, 4800, 2400, and 1200 bits/second (bps). At the 4800 bps rate, the mobile's transmitter power starts out at a power output that is reduced 3 dB from that used at the 9600 bps rate. The 2400 bps rate starts at a power output 6 dB less than the 9600 bps rate and the 1200 bps rate starts at a power output that is 9 dB less. These initial power settings are then varied in subsequent frames by the process of the present invention.

The base station cannot determine the data rate of a 20 ms data frame until well after the completion of the frame due to the forward error detection and correction coding (FEC) used. Therefore, when the base station receives a data frame from the mobile, it compares (305) the frame's SNR with each of the SNR threshold values that the base station has stored in a table. The base station has an SNR threshold value for each of the four different data rates used by the mobile in the preferred embodiment.

The base station next generates a power control command (310) for each of the four data rates depending on the comparison of the received frame's SNR and SNR threshold value for that particular data rate. As an example, if the SNR of the received frame is compared to the 9600 bps SNR threshold and is found to be too low for that data rate, the base station generates a power control command to instruct the mobile to increase its power output. The SNR of the received frame is then compared to the base station's 4800, 2400, and 1200 bps SNR threshold values in turn and a different power control command generated for each.

In the preferred embodiment, the power control commands generated above take the form of one or two bits in each power control group, depending on the data rate. These bits are located in the reserved bit location discussed above. A "1" in the proper bit position instructs the mobile to increase its output power while a "0" instructs the mobile to decrease its power. An alternate embodiment uses the "1" to instruct the mobile to decrease its power and the "0" to increase its power.

The power control commands are then transmitted by the base station to the mobile (315). Since the mobile knows which data rate it used in the frame transmitted to the base station, it knows which set of power control commands to use (320).

A detailed example of the power control process of the present invention as used in a mobile radiotelephone illustrates the operation of the process. The mobile transmitter modulation and coding scheme uses ⅓ convolutional coding. The convolutional code symbols are blocked into groups of 6, each of which determines which one of 64 possible orthogonal sequences are to be transmitted. The orthogonal sequence symbols are further covered by long and short length pseudo-random sequence chips that quadraphase modulate the sinusoidal carrier signal.

A data frame at the 9600 bps data rate contains 288 information bits, consisting, of 265 user information bits, a 12 bit cyclic redundancy check code, and an 8 bit convolutional code tail. The information bits are encoded into 576 data symbols by the constraint length 9 convolutional encoder. These are then grouped into 96 transmission symbols, each consisting of 6 of the convolutionally encoded data symbols.

Each transmission symbol chooses one of 64 different orthogonal chip sequences using a Walsh code. Each Walsh code consists of 64 Walsh chips. The Walsh chips must, therefore, be transmitted at a Walsh chip rate of 307.2 kHz. Each Walsh chip is then covered by a 1.2288 MHz chip rate pseudo-noise (PN) sequence produced by the long code generator. The result of this covering is further covered by each of two PN sequences produced by the short code generator.

The two resulting chip stream sequences control a quadraphase modulation process of a sinusoidal carrier signal. The short code generator produces a length 32768 chip sequence. This generator is synchronized to the same length sequence received by the mobile from the base station. The synchronization process takes into account the fact that different base stations use different phases of the short PN code so that the mobile short code is synchronized in all mobiles regardless of with which base station they are communicating. The long code generator produces a sequence that is 4,398,046,511,103 chips in duration. The synchronization of this sequence is adjusted according to the particular address being used by the mobile.

When the base station receives the signal from the mobile station, the base station generates the long and short code PN chip sequences that correspond to the codes assigned to the mobile. The received signal and the chip codes are combined in a correlator circuit. The correlator result, at a rate of 307.2 kHz that corresponds to the Walsh chip rate, is operated on by a fast Hadamard transform (FHT) circuit. This circuit sums the received Walsh chips in a manner corresponding to each of the possible Walsh codes that might have been transmitted by the mobile station.

The base station has multiple correlators and multiple receive antennas to allow multipath and antenna diversity to be obtained. The outputs of the multiple correlators and FHT circuits are combined in a diversity combiner circuit. Groups of six such FHT combined results are processed to obtain the received SNR measurement for the 9600 bps data rate. This can be done by summing the energy of the best of 64 outputs from each FHT process over the 6 Walsh symbols. This results in the power control group SNR measurement for 9600 bps. The 9600 bps received SNR is compared against the upper and lower 9600 bps target SNR values. In addition to power control group summing of power measurements, the diversity combiner outputs are decoded using a Viterbi algorithm decoder to recover the transmitted bits. If the CRC check passes, the receiving and decoding process is finished and the results are passed onto the vocoder or other service option processor. If the CRC does not pass, the processing continues at the lower data rates.

The comparison results are logically combined with the results of the comparisons for the lower data rates to determine the power control bits to be transmitted during each 1.25 ms power control group. If the received SNR exceeds the upper SNR target then both power control bits sent to the mobile in each 1.25 ms power control group are forced to be "turn down" commands. If the received SNR falls in between the upper and lower SNR thresholds, the first control bit corresponds to a "turn down" and the second bit corresponds to a "turn up" command. If the received SNR is below the lower SNR threshold, the first control bit is a "turn up" command and the second control bit is determined by the comparisons using the appropriate lower rate threshold.

If the mobile was transmitting a 9600 bps data frame and was not in the soft hand-off mode, then the mobile will increase transmitter power by 1 dB if the first control bit is a turn up command. If the first control bit is a "turn down" command, the mobile reduces transmitter power by 1 dB if the second power control command bit is also a "turn down" command. If a "down-up" command is received, the mobile does not change the transmitter power.

If the mobile is in a soft hand-off mode, transmitting a 9600 data frame, then power control commands are received from two or more base stations at the same time. The general rule for combining the control commands from multiple base stations is that power is turned up only if all received power control commands agree to turn up the power. Power will be turned down if any of the power control signals instruct the mobile to "turn down". Power will be unchanged if all but one base station command "turn up" and one commands "no change".

A data frame at the 4800 bps data rate contains 144 information bits consisting of 124 user information bits, a 10 bit CRC, and an 8 bit convolutional code tail. The 144 information bits are encoded into 288 data symbols by the constraint length 9 convolutional encoder. These are then grouped into 48 transmission symbols, each symbol consisting of 6 of the convolutionally encoded data symbols. Each transmission symbol chooses one of 64 different orthogonal chip sequences using a Walsh code. Each of the 48 symbols is repeated twice, resulting in 96 symbols as for the 9600 bps transmission rate. The result is covered with the PN chip sequences as before for 9600 bps.

The base station receives the signal from the mobile station as follows. The signals are correlated with the chip codes and processed by the FHT circuits as for 9600 bps. The repeated pairs of orthogonal symbols are combined, then combined with other correlator and antenna signals decoded by the Viterbi algorithm and the 8 bit CRC checked. If the CRC checks properly, the results are delivered to the vocoder or other service option processor.

The first power control group interval (1.25 ms) of the data frame contains six orthogonal symbols consisting of three different symbols each repeated twice. These are combined and compared with the half interval 4800 bps SNR threshold. The comparison result determines the second bit of the first power control group bit pair unless it is forced by the above logic into the up state.

During the second and third power control group, as well as the fourth and fifth, the sixth and seventh, etc., six orthogonal symbols are summed together for power control purposes. These are compared with the full interval 4800 bps SNR threshold. The comparison result determines the second bit of the third, fifth, seventh, etc. power control group bit pair unless forced by the "no change" command.

For the 4800 bps rate, the power control commands are contained in the second bit of the odd numbered power control groups. During even numbered power control groups, when transmitting 4800 bps, no power control is received. If the mobile was transmitting a 4800 bps data frame and was not in the soft hand-off mode, then the mobile will increase transmitter power by 1 dB if the second control bit is a "turn up" command. If the second control bit is a "turn down" command, the mobile will reduce transmitter power by 1 dB if the first power control command bit is not a "turn down" command. If a "down-up" command is received, the mobile will not change the transmitter power, assuming that one or the other two bits is received in error.

A data frame at the 2400 bps data rate contains 72 information bits consisting of 54 user information bits and an 8 bit convolutional code tail. The 48 information bits are encoded into 144 data symbols by the constraint length 9 convolutional encoder. These are then grouped into 24 transmission symbols, each consisting of 6 of the convolutionally encoded data symbols. Each of the 24 symbols is repeated four times, resulting in 96 symbols as for the 9600 bps transmission rate. Each transmission symbol chooses one of 64 different orthogonal chip sequences using a Walsh code and covered with the PN chip sequences as before for 9600 bps.

The base station receives the signal from the mobile station by correlating the received signals with the chip codes and processed by the FHT circuits as in the 9600 bps case. The repeated groups of four orthogonal symbols are combined, then combined with other correlator and antenna signals, and decoded by the Viterbi algorithm. If the decoder indicates an adequate received metric level, the results are delivered to the vocoder or other service option processor.

The first and second power control group intervals of the data frame contains 12 orthogonal symbols. Each symbol is the result of a four times repeat. Twelve successive orthogonal symbols can be combined as in the 9600 bps rate to form the received SNR measurement even though groups of four are combined for data demodulation. The SNR measurement is compared with the half interval 2400 bps SNR threshold. The comparison result determines the second bit of the second power control group bit pair unless it is forced by the above logic into the up state.

The third, fourth, fifth, and sixth power control groups are combined as above and compared with the full interval SNR target threshold. Likewise, for the seventh through the tenth and the eleventh through the fourteenth power control groups. The power control commands are contained in the second bit for the second, sixth, tenth, and fourteenth power control groups.

If the mobile was transmitting a 2400 bps data frame and was not in the soft hand-off mode, then the mobile increases transmitter power by 1 dB if an appropriate power control bit is a "turn up" command. If a power control bit is a "turn down" command, the mobile will reduce transmitter power by 1 dB. If a "down-up" command is received, the mobile will not change the transmitter power, assuming that one or the other of the two bits is received in error.

A data frame at the 1200 bps data rate contains 36 information bits consisting of 20 user information bits and an 8 bit convolutional code tail. The 36 informational bits are encoded into 72 data symbols by the constraint length 9 convolutional encoder. These are then grouped into 12 transmission symbols, each consisting of 6 of the convolutionally encoded data symbols. Each of the 12 symbols is repeated eight times, resulting in 96 symbols as for the 9600 bps transmission rate. Each transmission symbol chooses one of the 64 different orthogonal chip sequences using a Walsh code and covered with the PN chip sequences.

The base station receives the signal from the mobile by correlating the received signals with the chip codes and processed by the FHT circuits. The repeated groups of eight orthogonal symbols are combined, then combined with other correlator and antenna signals, and decoded by the Viterbi algorithm. If the decoder indicates an adequate metric level, the results are delivered to the vocoder or other service option processor.

The first four power control group intervals of the data frame contains 24 orthogonal symbols. Each symbol is the result of an eight times repeat. Twenty-four successive orthogonal symbols are combined to form the received SNR measurement while groups of eight are combined for data demodulation. The SNR measurement is compared with the 1200 bps SNR threshold. The comparison result determines the second bit of the fourth power control group unless it is forced by the above logic into the up state. Likewise, for the fifth through the eighth, the ninth through the twelfth and the thirteenth through the sixteenth power control groups.

If the mobile was transmitting a 1200 bps data frame and was not in the soft hand-off mode, then the mobile will increase transmitter power by 1 dB if an appropriate power control bit is a turn up command. If a power control bit is a "turn down" command, the mobile will reduce transmitter power by 1 dB. If a "down-up" command is received, the mobile will not change the transmitter power, assuming that one or the other of the two bits is received in error.

When the data rate changes from one data frame to the next, the transmitter power is changed to the corresponding level at the beginning of the data frame. All power control commands and adjustments are with respect to the nominal power used at each transmit data rate.

The SNR thresholds can also be changed dynamically by the mobile switching center that is connected to the base station. The mobile switching center connects the base station to the public switched telephone network (PSTN) and provides the switching functions required to pass data between the PSTN and the base station. If the base station is receiving from the mobile a signal that has a higher bit error rate than normal, the mobile switching center instructs the base station to increase the SNR threshold in the table for that mobile at that particular data rate.

In an alternate embodiment, the four power control commands are encoded in three bits of the frame. For example, the four threshold values define five possible SNR comparison outcomes. The first power control bit determines whether the received SNR exceeds the target level for 9.6 kbps. The remaining two bits use a binary encoding to indicate to which of the four lower levels the received SNR correlates.

In another embodiment, only two bits are used to control the mobile's transmitter power. This is accomplished by time sharing one of the bits between three of the thresholds. In this alternate embodiment, the first of two power control bits in each power control group are defined as in the preferred embodiment, i.e., transmit a "turn up" command if the received SNR exceeds the target SNR for 9.6 kbps and a "turn down" command otherwise.

In this alternate embodiment, the second of the two power control bits are time shared by every other bit signifying whether or not the received SNR exceeds target SNR for 4.8 kbps. The even numbered power control bits would alternately signify whether or not the received SNR exceeds the target SNR threshold for the 2400 and 1200 bps data rates. For example, in the sixteen power control groups of a data frame, the first, third, fifth, seventh, ninth, eleventh, thirteenth, and fifteenth would transmit a bit determined by whether or not the received SNR exceeds the SNR threshold for the 4800 bps data rate. The second, sixth, tenth, and fourteenth bits transmit a bit determined by whether of not the received SNR exceeds the SNR threshold for the 2400 bps data rate. The fourth, eighth, twelfth, and sixteenth bits transmit a bit determined by whether or not the received SNR exceeds the SNR threshold for the 1200 bps data rate.

In this alternate embodiment, the mobile, knowing the bit transmission rate it used to transmit the frame, interprets the received power control commands accordingly. For example, during transmission of a 9600 bps data frame, the second power control bit in each pair is ignored. During transmission of a 4800 bps data frame, the mobile ignores the first of each pair of bits in each power control group and obeys the second bit of the odd numbered pairs. The operation is similar for the 2400 and 1200 bps data rate cases.

In yet another embodiment, the base station uses two SNR thresholds for the 9600 bps rate, one just slightly above the target SNR threshold and one set slightly below the target SNR threshold. Obviously, the received SNR cannot be simultaneously above the threshold for 9600 bps and below the threshold for one of the three other data transmission rates. Due to the possibility of receiving the power control bits in error, the mobile could receive a pair of power control bits corresponding to such a situation. In this instance, the mobile should ignore this pair of bits since it is generally not possible to determine which of the two bits in the pair is in error. This embodiment, therefore, enables the sending of a "no change" power control command for the 9600 bps data rate.

If the received SNR exceeds the higher threshold, a "turn up" command is sent in the first of the pair of control bits in a power control group. If the received SNR is lower than the lower 9600 bps threshold, then a "turn down" command is sent.

The second bit of the power control group contains a "turn down" command unless the received SNR is lower than the appropriate threshold for a lower bit rate. If the received SNR falls between the upper and lower thresholds for 9600 bps, a "turn down" command is sent in the first command bit and a "turn up" is sent in the second bit. The mobile assumes that an error occurred in reception of the power control bits or assumes that a "no change" is being sent. In either case, the mobile does not change its transmitted power in the subsequent power control group time interval. This embodiment is useful in reducing the peak-to-peak fluctuation of mobile transmitter power when the power is adjusted very close to the target SNR. This reduces noise contributed by the mobile to other mobiles in communication with this particular base station.

In yet another alternate embodiment of the closed loop power control process of the present invention, a single power control bit is transmitted per power control group. In this embodiment, the odd numbered power control groups transmit a power control bit determined by the 9600 bps SNR threshold. Every other even power control group transmits a power control bit determined by the 4800 bps SNR threshold. The remaining even power control groups split between transmitting a bit determined by the 2400 bps SNR threshold and the 1200 bps threshold. For example, the first, third, fifth, seventh, ninth, eleventh, thirteenth, and fifteenth power control groups transmit a bit determined by the 9600 bps SNR threshold comparison. The second, sixth, tenth, and fourteenth bits transmit a bit determined by the 4800 SNR threshold comparison. The fourth and twelfth bits transmit a bit determined by the 2400 bps SNR threshold comparison. The eighth and sixteenth bits transmit a bit determined by the 1200 bps SNR threshold comparison. This technique reduces the number of power control bits transmitted on the base station to mobile link at the expense of reducing the rate of control bits by a factor of two, possibly resulting in greater error in closed loop power control in a high dynamic environment.

Still another embodiment of the closed loop power control process of the present invention relies on a predetermined pattern of thresholds, corresponding to different possible data rates. This process starts by the mobile or base station establishing the predetermined pattern of data rates. This pattern does not have to be evenly balanced but can be a function of expected data rates. A typical pattern looks like the following: 9600, 1200, 2400, 4800, and 14,400. This established data rate pattern is subsequently referred to as the assumed data rate pattern.

The assumed data rate pattern is then made known to both the mobile and the base station at some point, such as at call set up. If the mobile initiated the assumed data rate pattern, the mobile communicates the pattern to the base station and vice versa.

Using the assumed data rate pattern, the base station demodulator applies different energy thresholds to each power control group of received energy in determining the proper power control decision for each power control group. A typical example of an energy level threshold for each data rate is 9000 for 9600 bps, 6000 for 1200 bps, 3000 for 2400 bps, 1000 for 4800 bps, and 8000 for 14,400 bps.

The base station compares the energy of the incoming signal and guesses the data rate based on this energy level.

For example, if the base station received a signal having an energy level of 5000, it would assume the data rate is 1200 bps since this is the data rate associated with closest energy level stored in its table. The base station then sends a power control command to the mobile instructing it to increase power since at 1200 bps the base station expects to see an energy level of 6000.

The mobile decides how to use each power control command bit based on the value of the bit, the actual data rate used for the power control group, and the assumed data rate pattern that was used to compute the power control bit. The mobile knows which assumed data rate was used by the base station to create the power control decision by using the same procedure used by the base station: the data rate with the closest associated energy level.

The power control decision that the mobile uses to control its transmit power is determined by the following table:

|  | P.C. bit = UP | P.C. bit = DOWN |
|---|---|---|
| actual rate > assumed rate | increase power | ignore |
| actual rate = assumed rate | increase power | decrease power |
| actual rate < assumed rate | ignore | decrease power |

This table states that if the power control bit that the mobile receives from the base station instructs the mobile to increase power and the actual data rate is greater than or equal to the assumed data rate, then the mobile increases its transmit power. But if the power control bit instructs a power increase and the actual data rate is less than the assumed data rate, the power control instruction is ignored by the mobile.

The above table also shows that if the actual rate is less than or equal to the assumed rate, the mobile will decrease power if the power control bit is received instructing the mobile to decrease power. If the actual rate is greater than the assumed rate, the power control command to decrease power is ignored.

A benefit of this alternate embodiment is that, depending on the error rate of the power control channel, soft decisions can be incorporated in the power control commands to change the step sizes of the power increments and decrements. This is especially beneficial on weak decisions when the actual data rate and the assumed rate are far apart.

We claim:

1. At a base station, a method for controlling transmitter power of a remote communication device which transmits a signal at a predetermined data rate of a plurality of data rates, each data rate having a different power level, the method comprising the steps of:

receiving said signal;

determining a quality level of said received signal;

comparing said quality level to each of a plurality of quality thresholds which each correspond to a respective power level of said plurality of data rates;

generating a power control signal in response to said comparing step, said power control signal comprising a plurality of power control commands, each of said power control commands corresponding to one of said plurality of data rates; and transmitting said power control signal to said remote communication device.

2. The method of claim 1 wherein said plurality of data rates comprises N data rates and said power control signal comprises N power control commands, each of said power control commands corresponding to a different one of said plurality of data rates.

3. The method of claim 1 wherein said plurality of data rates comprises N data rates and said power control signal comprises N−1 power control commands, a first power control command of said N−1 power control commands corresponding to said comparing of said quality level to a maximum quality threshold of said plurality of quality thresholds and a remaining group of power control commands of said N−1 power control commands corresponding to said comparing of said quality level to each of a remaining group of quality thresholds of said plurality of quality thresholds.

4. The method of claim 1 wherein said power control signal comprises a plurality of power control groups, each power control group comprising:

a first power control bit corresponding to said comparing of said quality level to a first quality threshold of said plurality of quality thresholds; and a second power control bit corresponding, in a first power control group of said plurality of power control groups, to said comparing of said quality level to a second quality threshold of said plurality of quality thresholds, and corresponding, in a second power control group of said plurality of power control groups, to said comparing of said quality level to a third quality threshold of said plurality of quality thresholds.

5. The method of claim 1 wherein said power control signal comprises a sequence of power control bits, with every other one of said power control bits corresponding to said comparing of said quality level to a first quality threshold of said plurality of quality thresholds, and a remaining set of power control bits of said sequence of power control bits alternating in corresponding sequence to said comparing of said quality level to a different one of said plurality of quality thresholds.

6. In a remote communication device having a transmitter which transmits a signal at a predetermined data rate of a plurality of data rates, each of said plurality of data rates having a different power level, said remote communication device communicating with a base station, a method for adjusting transmitter power of said remote communication device, said method comprising the steps of:

transmitting a signal to said base station at a predetermined data rate of the plurality of data rates, said signal having a power level corresponding to said predetermined data rate;

receiving a power control signal corresponding to said plurality of data rates, said power control signal comprising a plurality of power control commands, each of said power control commands corresponding to one of said plurality of data rates; and adjusting said transmitter power in response to said power control signal and said predetermined data rate.

7. The method of claim 6 wherein said plurality of data rates comprises N data rates and said power control signal comprises N power control commands, each of said power control commands corresponding to a different one of said plurality of data rates.

8. The method of claim 6 wherein said plurality of data rates comprises N data rates and said power control signal comprises N-1 power control commands, a first power control command of said N−1 power control commands corresponding to a maximum data rate of said plurality of data rates and a remaining group of power control commands of said N−1 power control commands corresponding to each of a remaining group of data rates of said plurality of data rates.

9. The method of claim 6 wherein said power control signal comprises a plurality of power control groups, each power control group comprising:

a first power control bit corresponding, in each power control group of said plurality of power control groups, to a first data rate of said plurality of data rates; and a second power control bit corresponding, in a first power control group of said plurality of power control groups, to a second data rate of said plurality of data rates, and corresponding, in a second power control group of said plurality of power control groups, to a third data rate of said plurality of data rates.

10. The method of claim 6 wherein said power control signal comprises a sequence of power control bits, every other power control bit of said sequence of power control bits corresponding to a first data rate of said plurality of data rates, and a remaining set of power control bits of said sequence of power control bits correspondingly alternating in sequence to a different one of said plurality of data rates.

* * * * *